United States Patent [19]
Benz

[11] Patent Number: 5,829,423
[45] Date of Patent: Nov. 3, 1998

[54] SAW DISK

[75] Inventor: Gottfried Benz, Schaan, Liechtenstein

[73] Assignee: Hilti Aktiengesellschaft, Schaan, Liechtenstein

[21] Appl. No.: 577,450

[22] Filed: Dec. 22, 1995

[30] Foreign Application Priority Data

Dec. 22, 1994 [DE] Germany ............... 44 45 909.2

[51] Int. Cl.⁶ ............................................. B28D 1/04
[52] U.S. Cl. ............................................. 125/15; 125/13
[58] Field of Search ........................ 83/840, 844, 841; 125/13, 15

[56] References Cited

U.S. PATENT DOCUMENTS

| | | | |
|---|---|---|---|
| 416,094 | 11/1889 | Day | 83/841 |
| 784,113 | 3/1905 | Miner | 83/841 |
| 1,105,153 | 7/1914 | McLean | 83/841 |
| 1,546,201 | 7/1925 | Charlton | 83/844 |
| 1,583,765 | 5/1926 | Whitney | 83/840 |
| 1,708,131 | 4/1929 | Guindon | 83/840 |
| 1,796,864 | 3/1931 | Elmers | 83/841 |
| 3,122,030 | 2/1964 | Metzger . | |
| 3,307,242 | 3/1967 | Cofran | 83/844 |
| 3,885,488 | 5/1975 | Evancic et al. | 83/841 |
| 4,524,664 | 6/1985 | Tuomaala | 83/844 |
| 4,641,628 | 2/1987 | DeKok | 125/15 |
| 5,211,212 | 5/1993 | Carlson et al. | 83/840 |
| 5,441,033 | 8/1995 | Chiuminatta et al. | 125/15 |

FOREIGN PATENT DOCUMENTS

| | | | |
|---|---|---|---|
| 1127938 | 7/1982 | Canada . | |
| 0542023 | 5/1993 | European Pat. Off. . | |
| 297454 | 4/1917 | Germany . | |
| 1222234 | 8/1966 | Germany | 83/840 |
| 2284873 | 11/1990 | Japan . | |

*Primary Examiner*—James G. Smith
*Assistant Examiner*—Derris H. Banks
*Attorney, Agent, or Firm*—Anderson Kill & Olick P.C.

[57] ABSTRACT

A saw disk with replaceable cutting members (2) is formed of circular disk member (1) with uniformly spaced recesses (7) extending radially inwardly from an outer edge of the disk member. Each cutting member (2) has a support part (3) and a cutting part (4), with each support part (3) secured in one of the recesses (7) by a removable attachment member (5). The recesses (7) and the disk member (1) are arranged, so that the cutting members are radially insertable. The attachment members (5) are insertable in the axial direction of the disk member. In addition, safety elements (6) are provided for preventing axial displacement of the support part (3) in the recesses (7).

12 Claims, 3 Drawing Sheets

SAW DISK

BACKGROUND OF THE INVENTION

The present invention is directed to a saw disk with replaceable cutting members. The disk is a circular disk member with a circumferentially extending outer edge and uniformly spaced recess extending radially inwardly from the outer edge. Cutting members formed by a cutting part and a support part are each secured in one of the recesses by removable attachment means.

So-called wall type saws are used in the construction industry for producing large cuts through walls in cutting and repair work, for demolition work and for working on rock. Such saws have a motor-driven sawing member with an axially rotatable circular saw disk. The saw disk comprises a disk with cutting parts distributed around the outer circumference of the disk. The cutting members can be formed of a cutting alloy and often cutting parts formed of diamond grains embedded in a matrix are used. In use, the cutting parts are placed against the material to be worked. While the disk itself has a long useful life, the cutting parts wear down relatively quickly depending on the type of the material being worked. It is also possible that one or several cutting parts become separated from the disk due to shear forces occurring during the sawing operation. Therefore, it is necessary to replace the cutting parts.

In the past the cutting members have usually been soldered to the circumference of the disk or attached to it by laser welding. As a result, the replacement of the cutting members has been relatively expensive. In particular, there has been the danger that the disk would be impaired in its running-true operation by the local temperature stresses developed in the course of soldering or welding. Accordingly, it has frequently been necessary to subject the disk to an alignment operation by special thermal and mechanical treatment after replacing a cutting member. A specially designed saw blade is disclosed in U.S. Pat. No. 3,122,080 where recesses are located in the region between the cutting members and such regions are intended to carry away the local heat quantities generated during the soldering or welding of the cutting members. After the cutting members are attached, insert parts are clamped in the recesses intended to provided the required stiffness of the saw disk. Such a solution does provide the removal of heat to a slight extent, however, it is very expensive. Moreover, there is the danger that the recesses are deformed during the soldering or welding operation which can result in problems when attaching the precisely fitting inserts. To prevent the danger of possible deformation of the disk by local heat during the soldering or welding operation of the cutting members, it has been proposed to secure the cutting members to the disk by detachable fastening means.

In EP-A-O 542 023 it has been proposed to hold the cutting members in slot shape receptacles of a disk shaped carrier by a forced or clamping fit and the carrier is arranged in a replaceable manner in a radially oriented cut at the outer edge of the disk. The carrier has a threaded radial bore for receiving and tightening bolts. The cutting elements, shaped in a pin-like manner, are inserted radially into the slot-shaped receptacles of the disk-shaped carrier and are secured in the receptacles by the radial tightening bolts. While the cutting members are, to some extent, fixed in the radial direction by the tightening bolts, there is danger that they will give way in the axial direction under the axial and shearing forces developed during use. In such a situation, the cutting members can tilt axially and be sheared off in the receptacles. The disk shaped carrier is formed of an elastic plastics material. Accurate attachments are disposed on both of the narrow sides of the carrier which protrude into receptacles of the saw blade or disk, to fix the carrier in the radial and axial directions within the disk. Due to the radial and axially forces developed in operation and the shear forces, there is the danger of the elastic carrier being deformed, so that the force fit within the disk is no longer present. There is also the possibility of an axial tilting of the carrier so that it is sheared off the disk.

A saw disk disclosed in DE-A-25 06 742 is provided with replaceable cutting members, and the cutting members are formed of a cutting part and a base part carrying or supporting the cutting part. The disk has radially oriented recesses at its circumferential edge and the recesses are provided with an undercut. The base part has a shape corresponding to the radially oriented recesses and can be inserted axially into the recesses. The base part is also provided with a longitudinally extending slot forming two legs which are spread by an axial spreading member engaging between them in the region of a widened section of the slot, whereby the legs engage, in a clamping manner, the undercut side walls of the recess. While the cutting members are fixed in the radial direction by the undercut, there is the likelihood that they tilt axially in the recess and become sheared off by the axial and shearing forces developed during operation.

SUMMARY OF THE INVENTION

Therefore, it is the primary object of the present invention to provide a saw disk with replaceable cutting members whereby the cutting members are reliably fixed on the disk. The cutting members are effectively secured on the disk in spite of the action of axial and radial forces and of shearing forces. At the same time, a simple replacement of the cutting members is assured without any local heat loads acting on the disk. The replacement of the cutting members can be effected at the work site and, if possible, without any disassembly of the saw disk, and the replacement can be effected without any subsequent expensive realignment of the saw disk.

In accordance with the present invention the replaceable cutting members are insertable radially into recesses formed in the outer edge of the disk and attachment means are insertable in the axial direction of the disk member. Further, safety means are provided for preventing axial displacement of the support parts of the cutting members in the recesses. In particular, the wheel shaped disk is provided with radially arranged recesses spaced uniformly from one another around the outer edge of the disk. Each of the cutting members is formed of a cutting part and support part or carrier which can be fixed in the recesses by detachable attachment means. The recesses in the disk are arranged so that the cutting members can be inserted in the radial direction. The attachment means for the support part can be inserted axially. In addition, safety means are provided which prevent axial displacement of the support part from the recesses. The shape of the recesses for the radial insertion of the cutting members, the safety means preventing axial displacement, and the axially insertable attachment means which can be removed assure that the cutting members are fixed both in the axial and in the radial direction. The mounting of the cutting members on the disk is insensitive to the axial and radial forces as well as the shearing forces. The cutting members are easily replaced by removing the attachment means and reinstalling the attachment means. Local heat stresses on the disk are avoided. The replacement of the cutting members can be effected without any considerable force and can take place on the installed saw disk. Further alignment of the saw disk after the replacement of the cutting members is unnecessary.

The safety means for the support part in a first embodiment comprises at least one alignment pin provided at the base of the recess or in the support part. The pin cooperates with a matching bore in the support part or the disk. The alignment pin and the axially inserted attachment means secure the support part in the axial as well as the radial direction. Simultaneously, the alignment pin assists in the radial insertion of the support part into the recess, since the support part is guided by the pin and, therefore, cannot tilt. It is particularly advantageous if two alignment pins and two matching bores are disposed consecutively. In such an arrangement, the two alignment pins assure axial security, while the axial attachment means takes care of the axial fastening of the cutting member.

In an especially preferred embodiment the safety elements are in the shape of prismatic guides formed either as prismatic projections on the face of the recesses in the disk for the support part and/or at the end faces of the recesses or at the narrow sides of the support parts, as well as corresponding grooves on the narrow faces of the support part or on the disk and/or at the end of faces of the recesses. The prismatic guides for the support parts prevent axial yielding of the support parts under load. At the same time they insure a precise seating of the support parts. It should be noted that a combination of the alignment pins and the prismatic guides can also be used as safety means.

Preferably, the removable attachment means can be secured in axial through bores which are formed as half bores in the recesses in the disk and by similar half bores in the support part. The attachment can be arranged so that in the inserted position they fix the support part in the recesses by forces acting in an expanding or spreading manner. The attachment means not only carry centrifugal forces occurring in operation, simultaneous they take care of bracing the support part in the recesses.

In one arrangement, the attachment means can be cone shaped. In such an arrangement, the rear portion of the conically shaped member has an oversize relative to the through bore of approximately 0.5 mm to approximately 0.7 mm. The safety means are preferably designed as solid rivets or they can be formed by two half rivets. The cone shaped configuration permits a simple placement of the safety means. The spreading force is applied only by the completed driving of the safety means when the oversized rear region of the conical surface presses the two half bores apart. As a result, the support part is pressed against the opposite end wall of the recess and is braced in the recess.

In another preferred embodiment, the attachment means comprises a through bore and a nut so that when the nut is tightened a prestress is developed in the support part located in the recess. The bolt is provided with an internal hexagon shaped recess and can in this way to be unscrewed and tightened again by simple tool means. The head of the bolt and the nut are designed to be cone shaped. The angle of inclination of the cone shaped contact surfaces of the bolt head and the nut amount to approximately 42° to 70°, preferably 60°. Since the corresponding contact surfaces of the half bores have a slight inclination, a spreading or expanding effect is obtained if the bolt and the nut are completely tightened against one another.

Preferably, the attachments means are located ahead of the support member in the direction of rotation of the saw disk. In this manner the attachment means assist in absorbing the shearing forces and the inertia forces acting counter to the direction of rotation of the support part and thus assist in the expansion of the attachment means.

A motor driven cutting device, particularly for cutting construction materials, for instance reinforced or non reinforced concrete, or rock, is provided with a saw disk embodying the invention, and has a high security against detachment of the cutting members. The cutting members are securely retained and cannot tilt axially or radially during operation. The cutting members can be replaced without any expensive auxiliary means. A removal of the saw disk from the cutting device is not necessary. In accordance with the present invention, the replacement of the cutting members around the disk can be effected at a construction site.

DETAILED DESCRIPTION OF THE INVENTION

Figure 1:
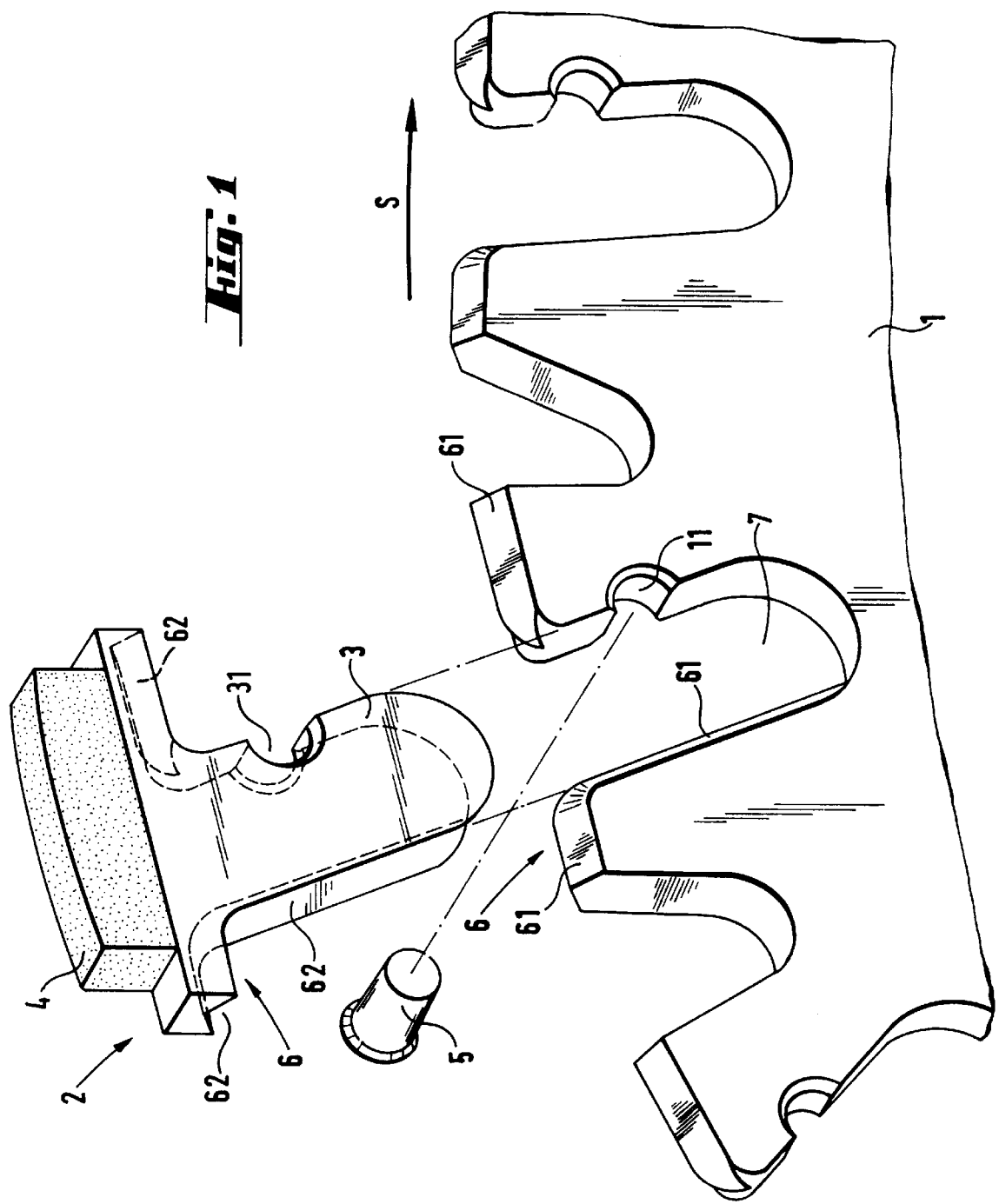
FIG. 1 is a perspective view of one embodiment of the present invention showing a cutting member in position to be inserted into a recess in the disk.
Figure 2:
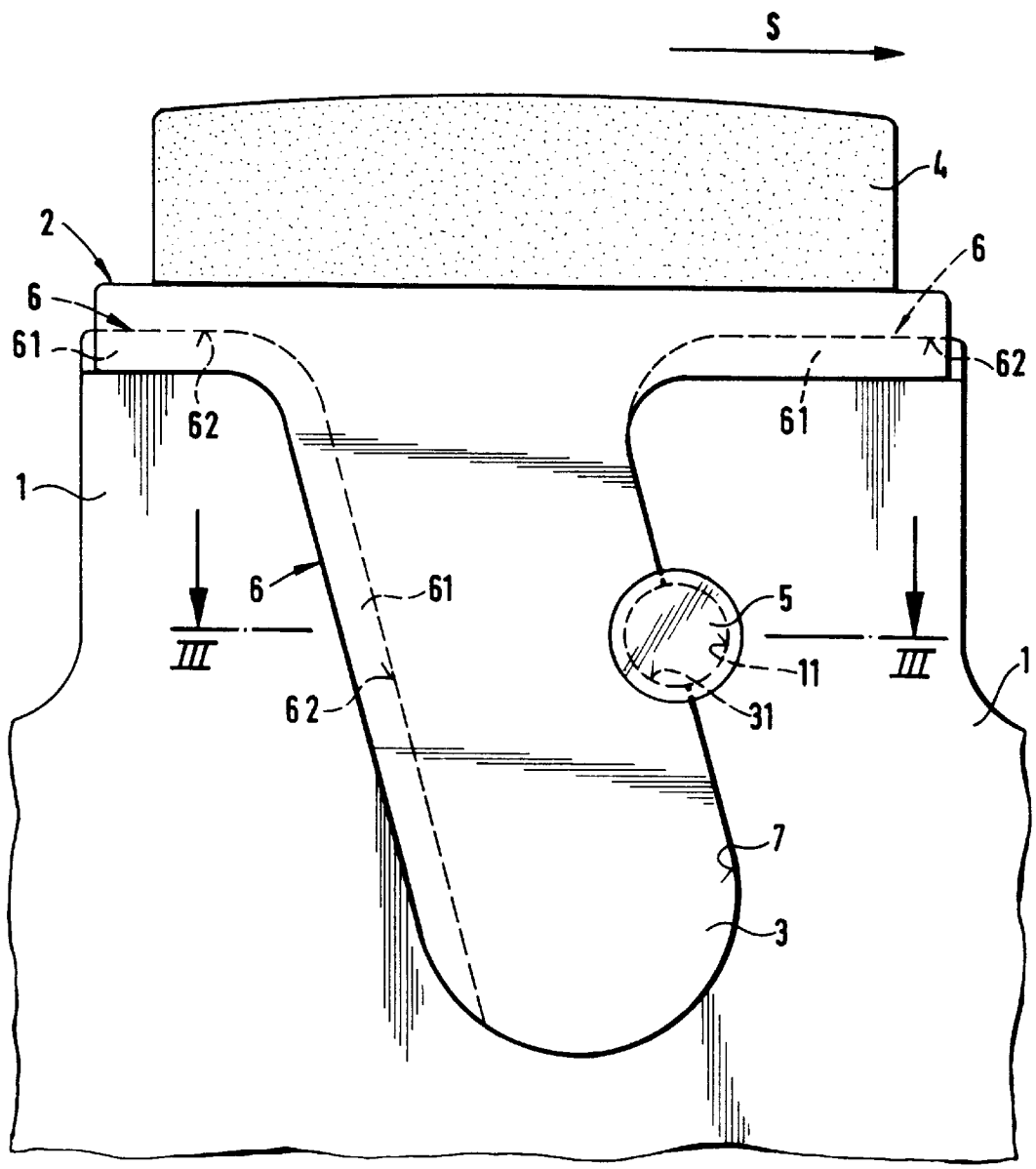
FIG. 2 is a side view of the embodiment shown in FIG. 1 with the cutting member inserted into the recess in the disk.
Figure 3:
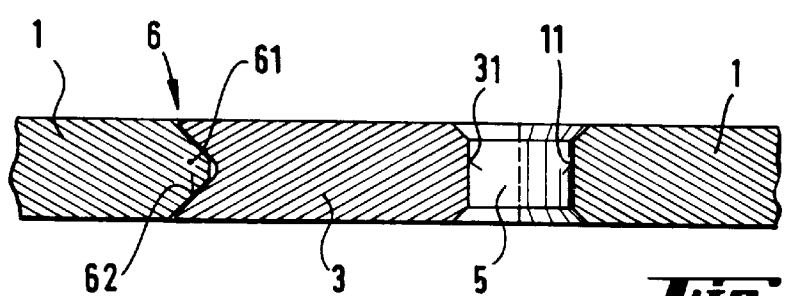
FIG. 3 is a cross sectional view taken along the line III in FIG. 2.
Figure 4:
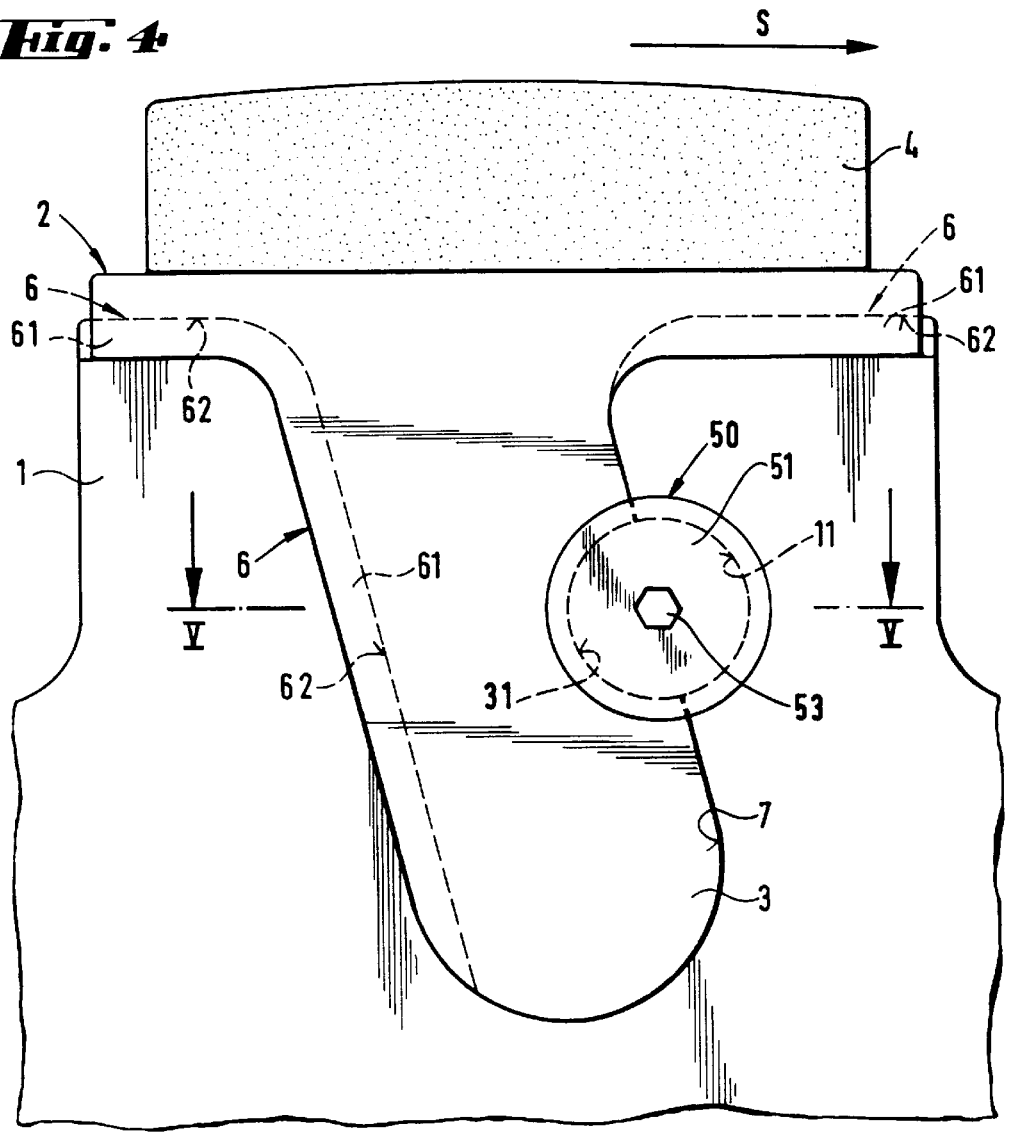
FIG. 4 is a side view of second embodiment of the invention illustrating the cutting member secured in a recess in the disk.

In FIG. 1 a first embodiment of the saw disk of the present invention is shown in perspective and in an exploded view with a replaceable cutting member 2 in position to be inserted in a recess 7 in a disk 1. The cutting member 2 is shown in the assembled position in a side view in FIG. 2 and in a sectional view in FIG. 3. The saw disk is formed of a circular disk member 1 rotatable about an axis, not shown, and with approximately radially oriented recesses 7 located at uniformly spaced positions around its circumferential outer edge. One of the recesses 7 is shown in FIGS. 1, 2 and 3. In FIG. 1, the cutting member 2 is positioned outwardly from the recess 7. The cutting member 2 is made up of a cutting part 4 arranged to project outwardly from the outer edge of the saw disk 1, so that it engages the material to be cut during operation of the saw disk, and a support part 3 to be fitted into the recess 7. The support part 3 is generally T-shaped with a head part extending along the circumferential outer edge on opposite sides of the recess 7. The head part of the support part 3 projects radially outwardly from the circumferentially extending outer edge. A leg part of the support part projects radially into the recess 7. The cutting part 4 projects outwardly from the head part and can be formed of a carbide, a cutting hard metal, or of a matrix containing diamond grains. As can be seen in FIGS. 1, 2 and 4, the cutting part 4 is block shaped and has an approximately parallelepiped form. The cutting part 4 and the support part are formed of different materials.

The recess 7, in accordance with the invention, is shaped so that the cutting member 2 can be inserted radially inwardly from the exterior of the saw disk. An axially insertable attachment means 5 secures the support part 3 in the recess 7 so that it cannot be moved in the radial direction. Safety means 6 prevent the support part 3 from moving axially relative to the disk. In the embodiment illustrated in FIGS. 1–3, the safety means 6 comprises a prismatic guide formed by a prismatic projection 61 at the end face of the recess, that is, along the circumferential outer edge, and at the surface of the recess in the disk 1 and by corresponding grooves 62 in the cooperating surfaces of the support part 3. The arrangement of the grooves and the matching projections can, of course, be reversed.

In another embodiment, not illustrated, but immediately apparent, the safety means are provided by at least one radial alignment pin and at least a corresponding bore which are arranged in the recess or at the support part or in the reverse. A preferred embodiment of the safety means 6 comprises two alignment pins and two corresponding bores. It is also possible to provide a combination of the alignment pins and the corresponding bores with the prismatic guides.

The axially insertable attachment means 5 is shown as a rivet with a cone-shaped head. The rivet can be inserted into a through bore extending axially of the disk and formed of a half bore 31 in the support part and a corresponding half bore 11 in the disk 1. The trailing cone-shaped head of the rivet has an oversize of approximately 0.5 mm to approximately 0.7 mm as compared to the through bore.

When the rivet is completely inserted, as shown in FIGS. 2 and 3, it exerts an expanding force on the support part 3 and presses its narrow side against the opposite wall surfaces of the recess 7, whereby it is braced in the recess. Instead of a single rivet, it is possible to use two rivet halves as the axially arranged attachment means 5. The rivet halves are inserted axially from opposite sides into the through bore. The expanding effect is gained when the two rivet halves are slid one over the other so that the overall diameter of the attachment means has a oversize compared to the through bore.

Figure 5:
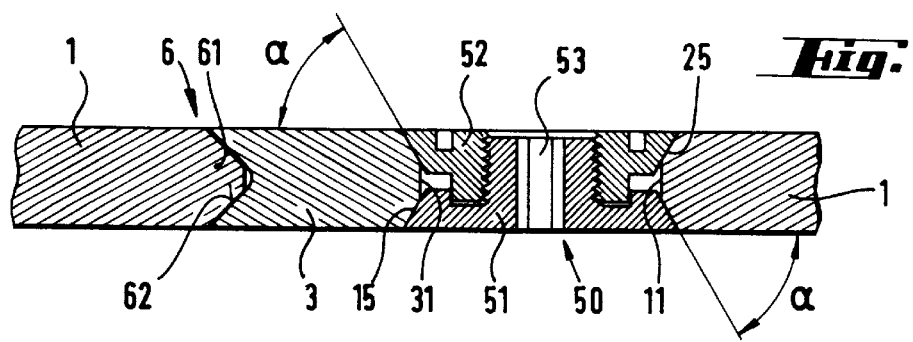
FIG. 5 is a cross-sectional view taken along the line V—V in FIG. 4.

Another embodiment of this saw disk is shown in FIGS. 4 and 5 with replaceable cutting members and is identical with the first embodiment as far as its basic arrangement is concerned. The difference is in the arrangement of the attachment means 50. In this second embodiment, the attachment means 50 is formed of pass through bolt 51 and a nut 52 cooperating with the bolt. The pass through bolt 51 has a cone shaped head at one end. Similarly, the nut 52 has a cone shaped circumferential outer surface. The nut has a cone shaped contact surface 15 and the bolt has a cone shaped contact surface 25 and the angle of inclination α of these surfaces is in the range of approximately 40° to 70°, preferably approximately 60°. Since the corresponding contact surfaces of the half bores have a slight inclination, a spreading effect is developed when the pass through bolt 51 and the nut 52 are completely screwed together. An internal hexagon 53 in the bolt 51 permits a simple loosening or tightening of the bolt-nut combination. The attachment means 50 is preferably arranged upstream of the support part 3 viewed in the rotational direction S of the saw disk. In this way, the attachment means assists the shearing forces and inertia forces in the expanding effect of the attachment means 50.

The design of the saw disk with replaceable cutting numbers, as provided by the invention, assures that the cutting members are secured in the axial as well as in the radial direction. The retention of the cutting members inserted into the disk is insensitive to the action of axial and radial forces and also of shearing forces. The cutting members can be replaced simply by the detachment and reattachment of the attachment means. Local heat stresses on the disk are avoided. The replacement of the cutting members can be effected without any great exertion of force and can be effected at the saw disk installed in a cutting device. Realignment of the saw disk after replacement of the cutting members is not necessary.

A motor driven cutting device, particularly for use in cutting construction materials, such as reinforced a non-reinforced concrete or rock, equipped with the saw disk of the invention, has a high degree of security against detachment of the cutting members. The cutting members are securely retained and cannot tilt or move radially in operation.

What is claimed is:

1. Saw disk, for use in the construction industry for producing large cuts through walls, in cutting and repair work, for demolition work and for working on rock, with replaceable cutting members (2) comprising a circular disk member (1) having an axis of rotation and a circumferentially extending outer edge with uniformly spaced recesses (7) extending radially inwardly from said outer edge, cutting members (2) each comprising a single cutting part (4) formed of a one of a carbide, a hard cutting metal or a matrix containing diamond grains and a separate generally T-shaped support part (3) and each secured in one of said recesses by removable attachment means (5, 50), said cutting part (4) is formed of a different material from and is fixed to said support part (3) and is block shaped in an approximately parallelepiped form, said support part having a head part extending circumferentially along and projecting radially outwardly from said circumferentially extending outer edge of said disk member, and a leg part extending radially inwardly from said head part and fitted into said recess, said cutting part (4) secured to and projecting radially outwardly from said head part of said supporting part, said head part extending circumferentially in opposite directions from said recess, said cutting members (2) being insertable radially inwardly into said recesses and said attachment means being insertable in the axial direction of said disk member (1), and safety means affording interengagement of said head part of said support part with said outer edge and recess for preventing axial displacement of said support parts (3) in said recesses (7).

2. Saw disk, as set forth in claim 1, wherein said safety means (6) comprises at least one alignment pin extending radially for each said support part (3) with said pin being positioned in one of said recess and said support part (3) and with a matching bore in the other one of said support part (3) and said disk (1) cooperating with said pin.

3. Saw disk, set forth in claim 2, wherein two alignment pins and two corresponding bores are arranged consecutively in the circumferential direction for each said support part (3).

4. Saw blade, as set forth in claim 1, 2 or 3, wherein said safety means (6) comprises prismatic guides comprising prismatic projections formed on one of said disk in the recesses (7) and at an outer edge of narrow sides of said support parts (3) with corresponding grooves (62) formed in one of the narrow sides of said support parts (3) and in said disk (1).

5. Saw disk, as set forth in claim 1, 2 or 3, wherein said attachment means (5, 50) being insertable in the axial direction into through bores in said disk formed by a half bore (11) in said disk adjoining said recess (7) and by a half bore (31) in said support part (3), and said attachment means (5, 50) providing an expanding action when inserted into said through bore.

6. Saw disk, as set forth in claim 4, wherein said attachment means (5, 50) being insertable into axially extending through bores in said disk formed by a half bore (11) in said disk adjoining said recess (7) and by a half bore (31) in said support part (3), and said attachment means (5, 50) providing an expanding action when inserted into said through bore.

7. Saw disk, as set forth in claim 5, wherein said attachment means (5) has a cone shaped surface oversized in the range of approximately 0.5 mm and to 0.7 mm relative to said through bore.

8. Saw disk, as set forth in claim 7, wherein said attachment means (5) comprises a unitary rivet.

9. Saw disk, as set forth in claim 7, wherein said attachment means (5) comprises two half rivets.

10. Saw disk, as set forth in claim 5, wherein said attachment means (50) comprises a pass through bolt (51) and a cooperating nut (52) each insertable from an opposite side of said disk for effecting a prestress in said recess (7).

11. Saw disk, as set forth in claim 10, wherein said pass through bolt (51) has a cone shaped head and said nut (52) has a circumferentially extending cone shaped surface, said head has a cone shaped contact surface (15) and said nut has a cone shaped contact surface (25) and said cone shaped contact surfaces (15,25) have an angle of inclination in the range of approximately 40° to 70° and said half bores (11, 31) arranged to receive said pass through bolt (51) and said nut (52) each have matching contacting surface with said contacting surfaces (15, 25) having a smaller angle of inclination.

12. Saw disk, as set forth in claim 5, wherein said attachment means (5, 50) being located upstream of said support part (3) viewed in rotational direction (S) of said saw disk about the axis thereof.

\* \* \* \* \*